(12) United States Patent
Mikhnevich et al.

(10) Patent No.: US 9,120,902 B2
(45) Date of Patent: *Sep. 1, 2015

(54) METHOD FOR PRODUCTION OF DRY HYDROLYTIC LIGNIN

(71) Applicant: Synergy Horizon Limited, Nicosia (CY)

(72) Inventors: Ivan Mikhnevich, Strovolos (CY); Mikhail Zhalezniak, Minsk (BY); Nikolay Asadchenko, Rechitsa (BY); Yury Dashchuk, Rechitsa (BY)

(73) Assignee: Synergy Horizon Limited, Nicosia (CY)

( * ) Notice: Subject to any disclaimer, the term of this patent is extended or adjusted under 35 U.S.C. 154(b) by 0 days.

This patent is subject to a terminal disclaimer.

(21) Appl. No.: 14/184,690

(22) Filed: Feb. 19, 2014

(65) Prior Publication Data

US 2014/0275500 A1    Sep. 18, 2014

Related U.S. Application Data

(63) Continuation of application No. 14/014,590, filed on Aug. 30, 2013.

(60) Provisional application No. 61/834,565, filed on Jun. 13, 2013, provisional application No. 61/787,924, filed on Mar. 15, 2013.

(51) Int. Cl.
| | |
|---|---|
| *C08H 7/00* | (2011.01) |
| *F26B 3/04* | (2006.01) |
| *C07G 1/00* | (2011.01) |
| *C08L 97/00* | (2006.01) |

(52) U.S. Cl.
CPC .. *C08H 6/00* (2013.01); *C07G 1/00* (2013.01); *C08L 97/005* (2013.01); *F26B 3/04* (2013.01); *C08L 2205/025* (2013.01)

(58) Field of Classification Search
CPC ........... F26B 1/00; F26B 3/04; C08L 97/005; D21C 3/04
USPC ............................. 530/500; 34/282, 443, 496
See application file for complete search history.

(56) References Cited

U.S. PATENT DOCUMENTS

| | | | | |
|---|---|---|---|---|
| 2,380,448 | A | | 7/1945 | Katzen |
| 3,577,467 | A | * | 5/1971 | Goldstein et al. ............. 568/749 |
| 3,739,913 | A | | 6/1973 | Bogosian |
| 4,102,783 | A | | 7/1978 | Zenno et al. |
| 4,497,688 | A | | 2/1985 | Schaefer |
| 4,599,808 | A | * | 7/1986 | Gelineau et al. ................ 34/443 |
| 5,328,562 | A | | 7/1994 | Rafferty et al. |
| 5,705,216 | A | | 1/1998 | Tyson |
| 5,777,086 | A | * | 7/1998 | Klyosov et al. ............... 530/500 |
| 5,820,687 | A | * | 10/1998 | Farone et al. ................ 127/46.2 |
| 5,879,463 | A | | 3/1999 | Proenca |
| 5,960,559 | A | * | 10/1999 | Brunnmair et al. ............. 34/514 |
| 5,975,439 | A | * | 11/1999 | Chieffalo et al. ............... 241/17 |
| 6,006,440 | A | * | 12/1999 | Wiesenhofer et al. .......... 34/305 |
| 6,161,784 | A | * | 12/2000 | Horton .......................... 239/654 |
| 7,396,434 | B2 | * | 7/2008 | Rodriguez Rivera et al. .. 162/16 |
| 7,470,463 | B2 | | 12/2008 | Medoff et al. |
| 7,544,635 | B2 | | 6/2009 | Liang et al. |
| 7,988,788 | B2 | * | 8/2011 | Hilst ............................... 127/37 |
| 8,147,650 | B2 | | 4/2012 | Griffiths |
| 8,613,781 | B2 | * | 12/2013 | Cooper .......................... 44/550 |
| 2003/0070995 | A1 | | 4/2003 | Breitenbeck |
| 2006/0169430 | A1 | * | 8/2006 | Tarasenko ....................... 162/81 |
| 2007/0082815 | A1 | | 4/2007 | Pihstrom |
| 2008/0047674 | A1 | * | 2/2008 | Ohman et al. .................. 162/16 |
| 2008/0202504 | A1 | * | 8/2008 | Hilst ............................... 127/37 |
| 2009/0038212 | A1 | * | 2/2009 | Cooper .......................... 44/550 |
| 2009/0223119 | A1 | * | 9/2009 | Brusletto et al. ............... 44/590 |
| 2009/0313847 | A1 | * | 12/2009 | Weigelt .......................... 34/282 |
| 2010/0154296 | A1 | | 6/2010 | Malhotra |
| 2010/0330633 | A1 | * | 12/2010 | Walther et al. ................ 435/150 |
| 2011/0239973 | A1 | * | 10/2011 | Qin ............................... 123/1 A |
| 2011/0245381 | A1 | * | 10/2011 | Winterowd et al. ............ 524/14 |
| 2011/0253326 | A1 | * | 10/2011 | Sherman et al. ................ 162/55 |
| 2011/0281321 | A1 | | 11/2011 | Skillicorn |
| 2011/0302832 | A1 | * | 12/2011 | Gronn ............................ 44/590 |
| 2011/0315637 | A1 | | 12/2011 | Koskan et al. |
| 2012/0029243 | A1 | * | 2/2012 | Pantouflas et al. ............ 568/630 |
| 2012/0108798 | A1 | * | 5/2012 | Wenger et al. ................ 530/500 |
| 2012/0145094 | A1 | * | 6/2012 | Simard ............................ 122/2 |
| 2012/0237989 | A1 | * | 9/2012 | Retsina et al. ................ 435/136 |
| 2012/0282465 | A1 | * | 11/2012 | Kadam et al. ................ 428/402 |
| 2012/0282467 | A1 | * | 11/2012 | Iyer et al. ..................... 428/402 |
| 2013/0066012 | A1 | * | 3/2013 | Winterowd et al. .......... 524/735 |
| 2013/0167603 | A1 | * | 7/2013 | Bathurst et al. .................. 71/23 |

FOREIGN PATENT DOCUMENTS

| | | |
|---|---|---|
| RU | 2170396 C1 | 7/2001 |
| RU | 66232 U1 | 9/2007 |
| RU | 77561 U1 | 10/2008 |
| RU | 78442 U1 | 11/2008 |
| RU | 87368 U1 | 10/2009 |

(Continued)

OTHER PUBLICATIONS

Evilevich, A.Z. et al., Waste-free production in the hydrolysis industry, M.: Forest Industry, 1982, p. -184.

(Continued)

*Primary Examiner* — Liam J Heincer

(74) *Attorney, Agent, or Firm* — Banner & Witcoff, Ltd.

(57) ABSTRACT

A method of drying hydrolytic lignin is provided. The hydrolytic lignin may be dried using a pre-drying step, followed by an additional drying step in a drying apparatus. The dry hydrolytic lignin powder may have a moisture content of below 30%.

15 Claims, 1 Drawing Sheet

(56) References Cited

FOREIGN PATENT DOCUMENTS

| | | |
|---|---|---|
| RU | 2397414 C2 | 8/2010 |
| RU | 103753 U1 | 4/2011 |
| RU | 103754 U1 | 4/2011 |
| WO | 2012085684 A2 | 6/2012 |

OTHER PUBLICATIONS

Evilevich, A.Z. et al., Waste-free production in the hydrolysis industry, M.: Forest Industry, 1982, p. -184 (English translation of cover page, pp. 10-11, 27-29, 45-47, 73-77.

Sidiras, D. et al., Development of a New Oil Spil Adsorbent from Autohydrolysis Modified Lignocellulosic Waste Material, Dept. of Industrial Management and Technology, Univeristy of Piraeus, Piraeus, GR, Dept. of Chemical Engineering and Materials Science, University of Minnesota, MN, ISBN: 978-1-61804-060-2, pp. 163-168.

Office Action in related U.S. Appl. No. 14/014,590, dated May 23, 2014.

International Search Report and Written Opinion in related PCT/IB2014/001226, dated Sep. 25, 2014.

International Search Report and Written Opinion in related PCT/IB2014/001226.

Final Office Action in related U.S. Appl. No. 14/014,590.

\* cited by examiner

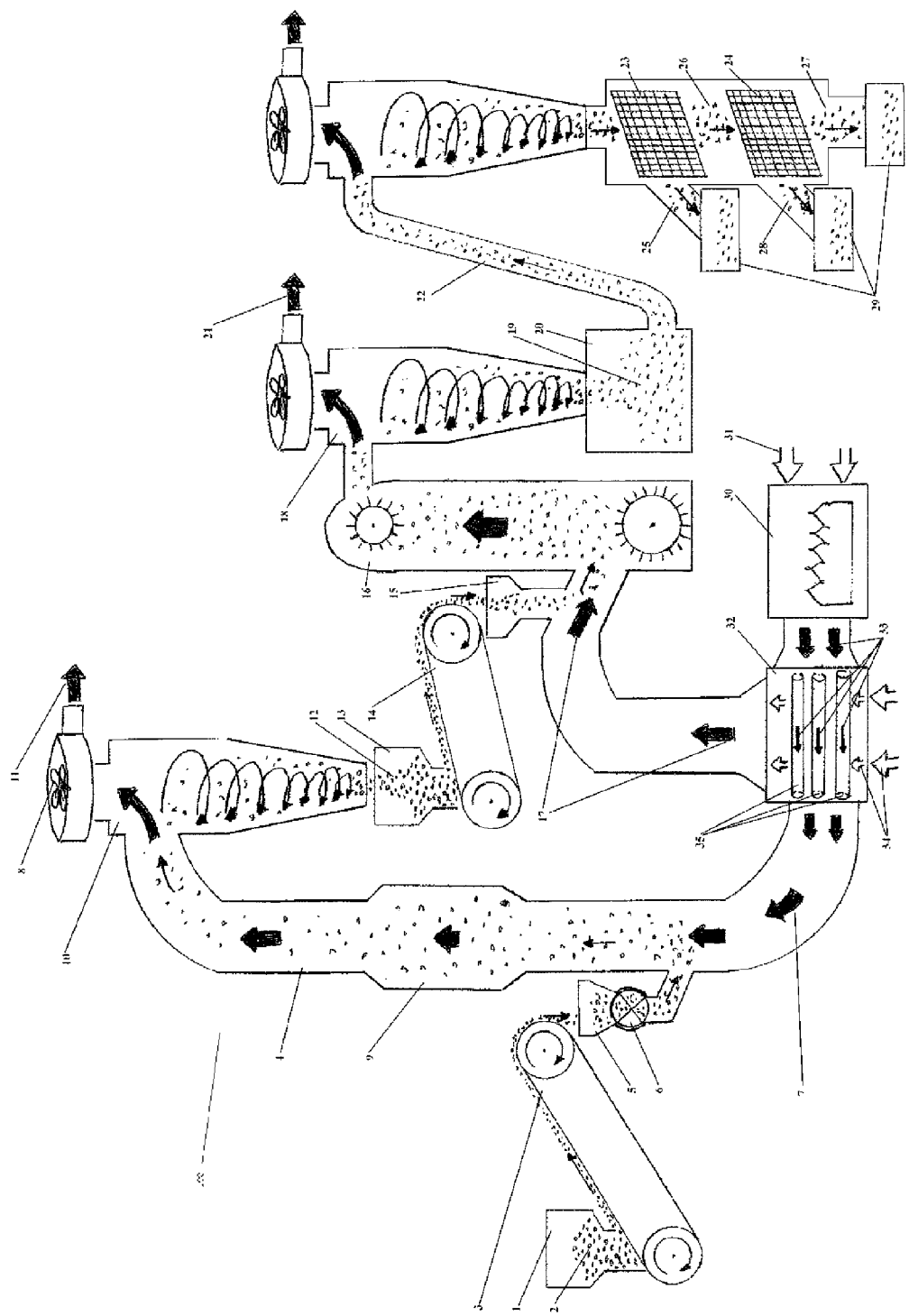

METHOD FOR PRODUCTION OF DRY HYDROLYTIC LIGNIN

CROSS-REFERENCE TO RELATED APPLICATIONS

This application claims priority to U.S. Non-Provisional application Ser. No. 14/014,590 filed Aug. 30, 2013, and titled "Method for Production of Dry Hydrolytic Lignin," U.S. Provisional Application Ser. No. 61/834,565 filed Jun. 13, 2013, and titled "Method for Production of Dry Hydrolytic Lignin" and U.S. Provisional Application Ser. No. 61/787,924 filed Mar. 15, 2013, and titled "Composite Sorbent for Petroleum Products and Composite Solid Fuel Formed Using Hydrolytic Lignin and Methods for Their Production," the entire disclosures of which are hereby incorporated by reference.

FIELD OF THE INVENTION

The present invention relates to an improved method of obtaining dry hydrolytic lignin. Dry hydrolytic lignin is currently used in the production of different products in different fields, including but not limited to use as a sorbent material, as a solid fuel or as a component in the formation of a composite sorbent material or a composite solid fuel.

BACKGROUND OF THE INVENTION

Hydrolytic lignin is a natural high-molecular weight polymer, resistant to degradation. Therefore, the search for new ways of processing and utilizing lignin is an important and environmental challenge. Additionally, there is a need for new methods for cleaning up water and oil pollution, specifically such pollution that is caused by petroleum products and other hydrocarbons.

Lignin has a high moisture content that makes it difficult to transport, dispense and mold. There are currently at least three methods commonly utilized by those of skill in the art to dry lignin that has a high moisture content. These methods include: utilizing mechanical pressure using screw machines, centrifuges, and/or special presses; thermal treatment using heated air or flue gases; and microwave or similar treatment. In some instances, if the hydrolytic lignin is dried utilizing a form of intensive drying, the adhering lignin may create sparks, which may lead to the ignition of lignin particles and explosions of the airborne dust. Additionally, attempts to use batch or continuous centrifuges for the extraction of water from lignin have also failed to produce positive results. Currently hydrolytic lignin may be pre-dried by holding it in the open for an extended period of time. However, such a process is low-tech, provides low-productivity, and is economically impractical.

It would be desirable to identify an improved method for drying hydrolytic lignin. Such an improved method of drying hydrolytic lignin could have an improved drying time and a reduced risk of explosive action. A hydrolytic lignin having a low moisture content could be beneficial in the production of a sorbent material or a solid fuel.

SUMMARY OF THE INVENTION

The following presents a simplified summary of aspects of the invention disclosed here. This summary is not an extensive overview, and it is not intended to identify all or only key or critical elements or to delineate the scope of the inventive products, compositions and methods covered by the claims. The following summary merely presents some concepts and aspects of the disclosure in a simplified form as a prelude to the more detailed description provided below of certain exemplary and non-limiting embodiments of the invention.

In accordance with a first aspect of the invention, a method of pre-drying hydrolytic lignin is provided, which includes blending hydrolytic lignin having a relative moisture content of 55% to 80% with hydrolytic lignin having a relative moisture content of 0% to 45% to produce a hydrolytic lignin product having a moisture content below 55%, wherein the ratio of hydrolytic lignins is from 1:6 to 10:1. In some aspects, the hydrolytic lignin product has a relative moisture content of 45% to 55%.

In a second aspect of the invention, a method of drying hydrolytic lignin is provided, which includes depositing hydrolytic lignin having a moisture content of 0% to 45% on a working surface of a mechanism that will be otherwise be contacted by hydrolytic lignin having a moisture content of 55% to 80%. In accordance with another aspect of the invention, a method of drying hydrolytic lignin is provided, which includes transporting a crushed hydrolytic lignin having a moisture content of below 30% using pneumatic transport.

In accordance with a third aspect of the invention, a method of drying hydrolytic lignin using a drying apparatus is provided, which includes pre-drying a hydrolytic lignin within a tube dryer to produce a pre-dried hydrolytic lignin with a moisture content of 30% to 40%, and drying the pre-dried hydrolytic lignin within a drying and grinding mechanism to produce a dried hydrolytic lignin with a moisture content of 0% to 25%. In some aspects, the hydrolytic lignin is added to the drying apparatus through a hopper. The hydrolytic lignin may comprise a mixture of a hydrolytic lignin with a moisture content of 0% to 45% and a hydrolytic lignin with a moisture content of 55% to 80%. In some aspects, the hydrolytic lignin with a moisture content of 0% to 45% is deposited on a conveyor belt prior to depositing the hydrolytic lignin with a moisture content of 55% to 80% onto the conveyor belt. The conveyor belt then transports the hydrolytic lignin to the tube dryer for pre-drying to produce a pre-dried hydrolytic lignin with a moisture content of 30% to 40%.

In some aspects, the dried hydrolytic lignin is transported from the drying and grinding mechanism to a separation and storage area by a pneumatic transport system. In certain aspects, the pre-drying of the hydrolytic lignin in the tube dryer is aided by a first heat-transfer medium. The first heat-transfer medium may have a temperature of 60° C. to 425° C. In other aspects, the drying of the pre-dried hydrolytic lignin in the drying and grinding mechanism is aided by a second heat-transfer medium. The second heat-transfer medium may have a temperature of 180° C. to 425° C. In certain aspects, the first heat-transfer medium is different than the second heat-transfer medium. The first heat-transfer medium may include flue gases and the second heat-transfer medium may include ambient air. In certain aspects, the method of drying hydrolytic lignin is an explosion and fire-safe method for drying hydrolytic lignin.

Further features and advantages of certain aspects of the present invention will become more fully apparent in the following description of the embodiments and drawings thereof, and from the claims.

BRIEF DESCRIPTION OF THE DRAWINGS

In the drawings, like reference characters generally refer to the same parts throughout the different views. Also, the drawing is not necessarily to scale, emphasis instead generally being placed upon illustrating the principles of the invention.

In the following description, various embodiments of the present invention are described with reference to the following drawing, in which:

FIG. 1 depicts a schematic of a drying apparatus for hydrolytic lignin according to an aspect of the present invention.

DETAILED DESCRIPTION OF THE INVENTION

Various examples and embodiments of the inventive subject matter disclosed here are possible and will be apparent to the person of ordinary skill in the art, given the benefit of this disclosure. In this disclosure reference to "some aspects," "certain aspects," "certain exemplary aspects" and similar phrases each means that those aspects or embodiments are merely non-limiting examples of the inventive subject matter, and there are alternative embodiments which are not excluded. Unless otherwise indicated or unless otherwise clear from the context in which it is described, alternative and optional elements or features in any of the disclosed embodiments and examples are interchangeable with each other. That is, an element described in one embodiment or example should be understood to be interchangeable or substitutable for one or more corresponding but different elements in another described example or embodiment and, likewise, an optional feature of one embodiment or example may optionally also be used in other embodiments and examples. More generally, the elements and features of any disclosed example or embodiment should be understood to be disclosed generally for use with other aspects and other examples and embodiments. A reference to a component or ingredient being operative or configured to perform one or more specified functions, tasks, and/or operations or the like, is intended to mean that it can perform such function(s), task(s), and/or operation(s) in at least certain embodiments, and may well be able to perform one or more other functions, tasks, and/or operations. While this disclosure mentions specific examples and embodiments, those skilled in the art will appreciate that there are numerous variations and modifications within the spirit and scope of the invention as set forth in the appended claims.

Each word and phrase used in the claims is intended to include all its dictionary meanings consistent with its usage in this disclosure and/or with its technical and industry usage in any relevant technology area. Indefinite articles, such as "a," and "an" and the definite article "the" and other such words and phrases are used in the claims in the usual and traditional way in patents, to mean "at least one" or "one or more." The word "comprising" is used in the claims to have its traditional, open-ended meaning, that is, to mean that the product or process defined by the claim may optionally also have additional features, elements, etc. beyond those expressly recited in the claim. The phrase "consisting essentially of" is used to signal that the product or process defined necessarily includes the listed ingredients and is open to unlisted ingredients that do not materially affect the basic and novel properties of the invention.

Lignin is a complex polymer compound commonly derived from wood and is found in the cells of vascular plants and some algae. It is one of the most abundant organic polymers on Earth, second only to cellulose. Lignin is unique as a biopolymer because of its heterogeneity and its lack of a defined primary structure. It is commonly found in both hardwood and softwood, with hardwood typically containing 18% to 24% by weight lignin, and softwood typically containing 27% to 30% by weight lignin.

Lignin often functions by providing support through the strengthening of wood in trees. It provides such support by filling spaces in the cell walls between cellulose, hemicellulose, and pectin. Lignin may act as an integral part of the secondary cell walls of plants. It provides mechanical strength to the cell wall, and by extension to the plant as a whole, by being covalently linked to hemicellulose and cross-linked with different plant polysaccharides.

Protolignin is the lignin contained within the plant in its natural form. It is distinguishable from the various technical forms of lignin, referred to here as technical lignin, which can be obtained by extraction from plant tissue using a variety of methods. It also can be found in biochemical production waste. Lignin is currently not manufactured.

Lignin is the highest tonnage waste of the pulp-and-paper and hydrolytic industries. It occupies large land areas and acts as a source of pollution. Annually about 70 million tons of technical lignin are derived worldwide. However, according to the International Lignin Institute, no more than 2% of technical lignin is used for industrial, agricultural, and other purposes. The remainder is burned in power plants or buried in landfills.

There are various methods that may be utilized to extract lignin from lignocellulosic material and obtain various types of technical lignins. Because each extraction method modifies the chemical structure of the natural lignin to some extent, the various lignin types are traditionally identified by the type of extraction method utilized. The extraction methods may be divided into two categories: (1) solvent extraction, which involves dissolving the lignin in a solvent; and (2) hydrolytic lignin, which is prepared by the hydrolysis of cellulose and hemicellulose by acids, leaving lignin as an insoluble residue. In contrast to the solvent extracted lignins, hydrolytic lignin is prepared by utilizing dilute acids. The dilute acids (0.5-1.0%) are utilized at elevated temperatures to achieve hydrolysis of polysaccharides and fermentation of sugars, leaving behind lignin as a solid product.

The process of preparing hydrolytic lignin comprises extracting lignin from raw material, which may include softwood, hardwood, corn waste, cane waste, straw of various grains, and other plant waste. The raw material may be treated with dilute acids at an elevated temperature so as to extract lignin. Once the hydrolytic lignin has been extracted, it is dried so as to be used in the production of solid, slurry, and mixed fuels; in medicines; in the chemical and thermal processes of activated carbon manufacturing; in the synthesis of lignin derivatives and products based on them; and as a primary or secondary component, such as a filler, in a variety of composite, structural, and thermal insulation materials and products.

There are currently at least three methods commonly utilized by those of skill in the art to dry wet lignin. These methods include: mechanical pressure using screw machines, centrifuges, and/or special presses; thermal treatment using heated air or flue gases; and microwave or similar treatment. These methods may be utilized individually or in combination in the drying of lignin.

Prior to utilizing one of these drying methods, the hydrolytic lignin may first be subjected to a pre-drying process. A pre-drying process is desirable because after the acid hydrolysis process by which the hydrolytic lignin is obtained, the lignin may have an increased water content. For example, the residual water content in lignin may be up to 4 g of water per 1 g of absolutely dry matter, or in other words, may have a relative moisture content of 80%. Absolutely dry hydrolytic lignin refers to hydrolytic lignin that has a moisture content of about 0%. Absolutely dry hydrolytic lignin is characterized as being a natural high-molecular weight polymer that does not have a significant portion of water, acid, oil or any other additives. It is currently understood that when hydrolytic lignin has a high moisture content it is no longer friable, i.e., it clumps, cakes and sticks to any surface it contacts. Additionally, lignin with high moisture content may be difficult to transport, dispense and mold. In particular, for producing a molded product, the lignin should not be in a fluid state having a relative moisture content above 70%, or in a viscoplastic state having a relative moisture content from 55% to 70%. At these moisture levels, screw machines cannot form a lignin cake and additionally the lignin cannot be granulated. Only after preliminary drying of the lignin to a residual relative moisture content of 40% to 50% on special presses lignin briquettes and pellets may be produced. The lignin briquettes and pellets may have a relative moisture content of 12% to 18%.

The hydrolytic lignin may be pre-dried within an auger, on a conveyor belt, in a dispenser, in the open via a silo, in some other drying equipment, or by utilizing a combination of any of these options. If the hydrolytic lignin is dried utilizing a form of intensive drying, the adhering lignin may create sparks, which may lead to the ignition of lignin particles and explosions of the airborne dust. Additionally, batch or continuous centrifuges are not effective for the extraction of water from lignin. Currently hydrolytic lignin is commonly pre-dried by holding it in the open for an extended period of time. However, such a process is low-tech, results in low-productivity, and is economically impractical.

An exemplary process for simplifying the process of drying and molding hydrolytic lignin has been identified. Prior to subjecting the hydrolytic lignin to a mechanical pre-drying process, wet hydrolytic lignin, that is a hydrolytic lignin having a relative moisture content of 55% to 80%, may be combined with dry hydrolytic lignin, that is a hydrolytic lignin having a relative moisture content of 0% to 45%, in a ratio ranging from 1:6 to 10:1.

The addition of dry hydrolytic lignin to wet hydrolytic lignin may be performed at any stage of the production process of the hydrolytic lignin product. Typically, the production process of the hydrolytic lignin utilizes a drying apparatus. In certain aspects, there are two significant points of the production process at which the addition of dry hydrolytic lignin to wet hydrolytic lignin may be considered most expedient. The first point occurs when dry lignin is poured into a hopper of a drying apparatus along with wet lignin, and is mixed there by mechanical means, assuring blending of the wet and dry hydrolytic lignin. The second point occurs when dry lignin is first poured evenly onto a moving conveyor belt, which supplies lignin from the hopper to subsequent stages of the production process. The wet lignin then falls on a thin layer of dry lignin, thereby precluding the lignin from sticking to the conveyor belt.

By first utilizing dry hydrolytic lignin, the wet hydrolytic lignin sticking problems are reduced and dealt with in the hopper and on the first conveyor belt of the production process. The conveyor belt feeds the raw material of a combination of dry hydrolytic lignin and wet hydrolytic lignin from the hopper to the pre-drying mechanism, where the combination of dry lignin and wet lignin have a relative moisture content of from 45% to 55%. Additionally, the combination of dry lignin with wet lignin assists in overcoming the highly explosive nature of hydrolytic lignin during the industrial scale drying of the lignin. The lower explosion limit of hydrolytic lignin is 52.5 g/m$^3$, the auto-ignition temperature is 425° C., the ignition temperature is 195° C., and the smoldering temperature is 185° C. A high level of safety and performance is necessary for the industrial scale drying of hydrolytic lignin.

As can be seen in FIG. 1, a drying apparatus 100 for producing hydrolytic lignin is provided. The first step of the production process is a pre-drying step which is carried out in a tube dryer 4. In certain aspects, the tube dryer 4 is at least 10 meters in height. Hydrolytic lignin raw material 2 in an initial hopper 1 may be dispensed onto a conveyor belt 3 and fed into a feed chute 5 of the tube dryer 4. The conveyor belt 3 may deposit the hydrolytic lignin at a location near the bottom of the tube dryer 4. An optimal height for the conveyor belt 3 to dispense the hydrolytic lignin 2 is about 0.5 m to 1.5 m from the bottom of the tube dryer. The tube dryer feed chute 5 controls the required raw material feed parameters by means of a dispensing mechanism 6. In one aspect, the dispenser mechanism 6 has blades, fixed to and rotating about an axis placed inside a cylinder, with a feed port at the top. In this manner, the raw material 2 enters the tube dryer 4. The amount or volume of lignin that may be added is limited by the adjacent blades and the housing of the cylinder of the dispenser mechanism 6. Additionally, the dispensing rate is defined by the size and the number of blades in conjunction with their rotation speed. Any excess amount of raw material 2 remains in the pre-loading area or initial hopper 1 and is fed into the apparatus at a later time. The dispenser mechanism 6 is one of the most vulnerable places for the wet hydrolytic lignin material to stick. Therefore, to assure its proper operation, dry hydrolytic lignin may be deposited with wet hydrolytic lignin, as previously discussed, so as to reduce the moisture in the raw materials. The moisture content of the raw material may be reduced to 45% to 55%.

A gaseous heat-transfer medium 7 is fed into the lower part of the tube dryer 4. In certain aspects, the gaseous heat-transfer medium 7 is formed from flue gases 33 that have passed through a heat exchanger 32. By passing the flue gases 33 through the heat exchanger 32, the gases may disperse a portion of their heat in the heat exchanger 32. For example, the flue gases 33 may heat the tubes 35 within the heat exchanger 32 through which the flue gases 33 pass. In certain aspects, a second gas, such as, for example, ambient air 34 may be heated as it passes around the heated tubes 35. In certain aspects, the tubes 35 may transfer about 50% of their heat to the ambient air 34. In certain aspects, the temperature of heated ambient air 34 may not exceed the temperature of the flue gases 33 at the exit from heat exchanger 32. The result is a fuller utilization of thermal energy. In certain aspects, the energy exchange coefficient or heat transfer coefficient will be dependent on the volume of air flowing through the heat exchanger per a time unit. The production of dry hydrolytic lignin may be temperature sensitive, therefore the temperature of the heat-transfer medium 7 may be maintained within a certain range.

If the heat-transfer medium has a temperature of below 60° C., the tube dryer 4 may fail to provide adequate moisture removal from the raw material. Additionally, if the heat-transfer medium has a temperature of above 425° C., a risk develops of spontaneous combustion or explosion of the hydrolytic lignin. The risk of spontaneous combustion or explosion of the hydrolytic lignin arises due to the accumulation of dried hydrolytic lignin on the inside surface of the tube dryer. The heat-transfer medium may have a temperature of below 425° C., or in alternative aspects may have a temperature of below 400° C. If the heat-transfer medium has a temperature of about 425° C. then safety mechanisms to prevent a fire and/or explosion may be implemented. In certain aspects, an optimal gaseous heat-transfer medium temperature is between 60° C. and 185° C., more preferably is between 80° C. and 180° C.

In certain aspects, a suction and/or blowing fan 8 is located at the top and/or bottom of the tube dryer 4. The motor power rating and the configuration of the fans are optimized so as to provide aerodynamic flow sufficient to raise the raw hydrolytic lignin material 2 to the top of the tube dryer 4. The raw material 2 may be transferred by the aerodynamic flow from the lower part of the tube to the upper part of the tube. During the transfer from the lower part of the tube to the upper part of the tube, the raw material may be heated by the gaseous heat-transfer medium 7, and may also release a portion of the moisture present in the lignin.

In certain aspects, the tube dryer diameter may be enlarged at the middle section 9. The hydrolytic lignin particles 2 accelerate in the bottom section of the tube, but their speed is reduced in the middle section, thereby providing for a longer exposure to the gaseous heat-transfer medium 7. Additionally, within the top sections, due to the narrowing of the tube, the particles accelerate again in the gas flow so as to overcome the final part of the route through the tube dryer 4. The top of the tube dryer 4, in some aspects, contains a sedimentation cyclone 10. The sedimentation cyclone 10 precipitates the pre-dried raw material 12 into a hopper 13 and releases the spent heat-transfer medium 11 into the atmosphere. The spent heat-transfer medium 11 may include flue gases and water vapor.

The tube dryer portion of the drying apparatus provides pre-drying of the raw materials so as to provide a pre-dried hydrolytic lignin having 30% to 40% relative moisture content. In addition, the pre-drying of the hydrolytic lignin utilizing the tube dryer facilitates the subsequent drying steps of the hydrolytic lignin. In certain aspects, the use of heat exchanger flue gases increases the efficiency of the drying apparatus by utilizing the residual energy of flue gases.

In certain aspects, the pre-dried hydrolytic lignin raw material 12 is transferred from the tube dryer 4 to a loading chute 15 for a drying and grinding unit 16 by way of a conveyor belt 14 or other suitable transport means. Drying and grinding units are discussed in Russian Utility Model Nos. 66232, 77561, 78442, 87368, 103753, and 103754, which are herein incorporated by reference. The drying and grinding unit 16 may be an aerodynamic dryer of special design, and equipped with a crushing/milling mechanism. The drying and grinding unit 16 may be utilized to grind the pre-dried raw material 12, and then to dry the material further as it is lifted by a flow of gaseous heat-transfer medium 17. In certain aspects, the gaseous heat-transfer medium 17 present in the drying and grinding unit 16 may be different than the gaseous heat-transfer medium 7 present in the tube dryer 4. The gaseous heat-transfer medium 17 present in the drying and grinding unit 16 may, in some aspects, be heated air. In some aspects, the top portion of the drying and grinding unit may have a sedimentation cyclone 18. The sedimentation cyclone 18 may precipitate the dried raw material 19 into a storage hopper 20. In addition, the sedimentation cyclone 18 may release the spent heat-transfer medium 21 into the atmosphere. The spent heat-transfer medium 21 may include heated air and water vapor.

The dried hydrolytic lignin raw material 19 located in the hopper 20 may, in certain aspects, be transferred to a separation and storage area, such as an area having one or more vibrating inclined screens 23 and 24. The dried raw material 19 should, in certain aspects, not be transferred by conveyor belt from the hopper to the area with the vibrating inclined screens due to an explosion and fire hazard. The dried raw material 19 exists as a low moisture product that is accompanied by a high amount of dustiness. Both of these factors raise the risk of an explosion or fire.

In certain aspects, the transfer of dried raw material 19 will occur by pneumatic transport. The pneumatic transport system 22 may include pipes with a stream of air created by a fan so as to move the dried raw material 19 from the hopper 20 to the area having the one or more vibrating inclined screens 23 and 24.

In some aspects, dry hydrolytic lignin 19 may be supplied by pneumatic transport to the one or more vibrating inclined screens 23 and 24. In certain aspects, a vibrating inclined screen 23 may have a net size equal to an upper limit for a desired particle size, such as, for example, a net size of 1 mm. In certain other aspects, a vibrating inclined screen 24 may have a net size equal to a lower limit for a desired particle size, such as, for example, a net size of 0.25 mm. The application of dry hydrolytic lignin 19 to the one or more vibrating inclined screens allows for the separation of particles by their sizes.

The dry hydrolytic lignin 19 may be separated by one or more vibrating inclined screens 23 and 24 into various particle sizes. In certain aspects, the particles 25 may have a size that is larger than a defined upper limit, that is larger than 1 mm. Other particles 26 may have a size less than an upper limit of 1 mm, therefore having a size of 0 mm to 1 mm. A third group of particles 27 may have a size that is smaller than a defined lower limit of 0.25 mm, that is have a particle size of less than 0.25 mm. Finally, a fourth group of particles 28 may have a size within a specific size limit, that is within a size range of 0.25 mm to 1 mm. Each individual group of particles of dry hydrolytic lignin may be collected in storage or packing devices 29.

The fraction of hydrolytic lignin powder having a particle size that is beneficial for the production of a composite sorbent may be transported to the powdered sorbent packing line or to the subsequent production of composite sorbent materials. The hydrolytic lignin particles of other sizes that are not suitable for use as a sorbent may be transported to the packing line for components or directly to production of composite solid fuels.

The heat-transfer medium 17 for the drying and grinding unit 16, in certain aspects, is a combination of the heat generator flue gas 33 mixed with ambient air 34. However, the flue gases 33 may contain flame and sparks from the combustion of fuel, resulting in fire and explosion when working with hydrolytic lignin. In certain aspects, for safe and continuous operation, any possible fires and explosions may be eliminated, by utilizing a heat-transfer medium with low oxygen content. In some aspects, flue gases alone may be a heat-transfer medium. However, these flue gases may have a high temperature, which may complicate the drying of the hydrolytic lignin. Additionally, prior extraction of flue gas heat may not occur prior to their use as a heat-transfer medium, further complicating the drying process. Moreover, it is often extremely hard to ensure the absence of oxygen in the flue gases, especially when using a solid fuel boiler, which is operated with the inevitable excess of combustion air.

In certain aspects, a gas-air tube-type heat exchanger 32 may include an insulating body containing a set of tubes 35, inside of which pass the hot flue gases 33 from the boiler 30, which is fed with intake air 31. In some aspects, the tubes 35 are metal tubes that may have, for example, a length of 1 m to 5 m. A fan may blow ambient air 34 around the outside of the tubes 35 heated by the boiler flue gases 33, thereby heating the ambient air 34 by the heat of the metal pipes. The hot air may be utilized as a heat-transfer medium 17 for the drying and grinding unit 16. This eliminates the presence of flame or sparks in the gaseous heat-transfer medium 17, and provides the necessary safe temperature of heat-transfer medium through the design of the heat exchanger 32 and additional channels, which bypasses the heat exchanger. This ensures continuous safety of the drying and grinding operation. Given that a heat exchanger of limited size transfers only part of the heat energy from one medium to another, it is advisable to use the flue gases 33 exiting the heat exchanger 32 as a heat-transfer medium 7 for other heat consumers. For example, other heat consumers in the production chain include the tube dryer 4, as described above, which provides pre-drying of the raw material.

Flue gases 33, as a heat-transfer medium, may be any temperature depending on the design features of the heat exchanger 32 and the boiler 30, the fuel used, and the operating mode. To comply with fire or explosion safety during pre-drying, in certain aspects the tube dryer 4 requires a gas temperature below 425° C., and in certain exemplary aspects, the gas temperature is no higher than 400° C. A gas temperature of below 400° C. may provide protection from temperature fluctuations due to the boiler 30 producing fluctuations in the temperature. If this temperature is exceeded, the flue gases 33 may be mixed with ambient air 34 to reduce the temperature of the gaseous heat-transfer medium 7 before entering the tube dryer 4.

In certain aspects, the drying apparatus 100 may be built with a heat exchanger 32 designed to facilitate the transfer of a sufficient amount of the heat to the other heat-transfer medium 17, such as air, while the rest of the heat may be transferred to the outgoing flue gases 33. In certain aspects, the temperature conditions may be set on the drying apparatus 100 such that the heat exchanger 32 may be designed for heating the air supplied to the drying and grinding unit 16 in the amount required for operation of the unit. The air may be heated to a temperature of 200° C. to 400° C., or in alternative aspects to a temperature of 200° C. to 300° C. Additionally, the working temperature of the boiler flue gas at the heat exchanger inlet may be at a level of 400° to 800° C., considering the design features of the heat exchanger 32 and the absence of ambient air addition to either type of the gaseous heat-transfer media in use. In certain aspects, when operating a boiler 30 with a high flue gas temperature, the heat exchanger 32 may be designed with a reduced co-efficient of heat transfer. Further, additional by-pass ducts may be added to mix in ambient air 34, and ambient air 34 may be added to the flue gases 33 during the pre-drying stage in the tube dryer 4.

In certain aspects, hydrolytic lignin may be used as fuel for the heat generator of the drying apparatus. In some aspects, to improve the calorific value of the hydrolytic lignin, it may be considered beneficial to blend the dried hydrolytic lignin with petroleum products, such as used industrial oils or heavy fuel oil. It may be possible to achieve a calorific value up to 32 MJ/kg (7,650 Kcal/kg) for the treated hydrolytic lignin, as compared to the baseline calorific value of hydrolytic lignin with 0% moisture of about 21 MJ/kg (5,000 Kcal/kg). It is currently understood that by adding petroleum products to the hydrolytic lignin, the calorific value of the treated hydrolytic lignin increases by a value of about 50%. Further, the use of waste oil and waste industrial and motor oils makes for a cost efficient and environmentally friendly treatment of the hydrolytic lignin.

The hydrolytic lignin prepared by way of the drying process is a low moisture hydrolytic lignin, and more specifically is a hydrolytic lignin having a moisture content of 0% to 25%. In some aspects, the moisture content of the hydrolytic lignin may be varied depending on the system settings of the drying apparatus, and the particle size of the hydrolytic lignin.

EXAMPLES

Example 1

Drying Hydrolytic Lignin

A 100.0 g sample of hydrolytic lignin with 70.0% moisture content was mixed with 62.5 g of lignin having a relative moisture content of 5.0% to yield 162.5 g of lignin with a relative moisture content of 45.0%.

Example 2

Drying Hydrolytic Lignin

A 100.0 g sample of hydrolytic lignin with 60.0% moisture content was mixed with 42.9 g of lignin having a relative moisture content of 10.0% to yield 142.9 g of lignin with a relative moisture content of 45.0%.

Example 3

Drying Hydrolytic Lignin

A 100.0 g sample of hydrolytic lignin with 65.0% moisture content was mixed with 33.3 g of lignin having a relative moisture content of 5.0% to yield 133.3 g of lignin with a relative moisture content of 50.0%.

Example 4

Drying Hydrolytic Lignin

A 100.0 g sample of hydrolytic lignin with 55.0% moisture content was mixed with 86.2 g of lignin having a relative moisture content of 1.0% to yield 186.2 g of lignin content with a relative moisture of 30.0%.

Example 5

Drying Hydrolytic Lignin

A 100.0 g sample hydrolytic lignin with 55.0% moisture content was mixed with 120.0 g of lignin having a relative moisture content of 0.0% to yield 220.0 g of lignin with a relative moisture content of 25.0%.

We claim:
1. A method of transporting hydrolytic lignin for drying comprising
depositing hydrolytic lignin having a low moisture content of 0% to 45% on a working surface of a mechanism,
depositing a hydrolytic lignin having a high moisture content of 55% to 80% onto the hydrolytic lignin having the low moisture content precluding the high moisture content from contacting the working surface of the mechanism, wherein the ratio of the hydrolytic lignin having the high moisture content to the hydrolytic lignin having the low moisture content is from 1:6 to 10:1 and
transporting the hydrolytic lignin having the low moisture content and the hydrolytic lignin having the high moisture content to a drying apparatus.
2. An explosion and fire-safe method of drying hydrolytic lignin comprising a gas-air heat exchanger including:

blending a hydrolytic lignin having a relative high moisture content of 55% to 80% with a hydrolytic lignin having a relative low moisture content of 0% to 45% to produce a hydrolytic lignin product, wherein a ratio of the hydrolytic lignin having the high moisture content to the hydrolytic lignin having the low moisture content is from 1:6 to 10:1 and wherein the hydrolytic lignin with a moisture content of 0% to 45% is deposited on a conveyor belt prior to depositing a hydrolytic lignin with a moisture content of 55% to 80% onto the conveyor belt to produce the hydrolytic lignin product, transferring the hydrolytic lignin product to a tube dryer, pre-drying the hydrolytic lignin product using a stream of a first heat-transfer medium in the tube dryer to produce a pre-dried hydrolytic lignin having a relative moisture content less than that of the hydrolytic lignin product, wherein the first heat-transfer medium has a temperature of 60° to 425° C., transferring the pre-dried hydrolytic lignin to a drying and grinding unit, further drying the pre-dried hydrolytic lignin in a stream of a second heat-transfer medium in the drying and grinding unit to produce a dried hydrolytic lignin having a relative moisture content less than that of the pre-dried hydrolytic lignin, wherein the second heat-transfer medium has a temperature of 180° to 425° C., transferring the dried hydrolytic lignin to a separation and storage area, and separating the dried hydrolytic lignin by particle size using vibrating inclined screens to produce a separated hydrolytic lignin.

3. The method of drying hydrolytic lignin of claim 2, wherein the first heat-transfer medium includes flue gases.

4. The method of drying hydrolytic lignin of claim 2, wherein the second heat-transfer medium includes ambient air.

5. A method of transporting hydrolytic lignin for drying comprising depositing hydrolytic lignin having a low moisture content of 0% to 45% on a working surface of a mechanism and depositing a hydrolytic lignin having a high moisture content of 55% to 80% onto the hydrolytic lignin having the low moisture content precluding the high moisture content from contacting the working surface of the mechanism, wherein the ratio of the hydrolytic lignin having the high moisture content to the hydrolytic lignin having the low moisture content is from 1:6 to 10:1.

6. The method of drying hydrolytic lignin of claim 2, wherein the pre-dried hydrolytic lignin product has a relative moisture content of 30% to 40%.

7. The method of drying hydrolytic lignin of claim 2, wherein the separated dried hydrolytic lignin has a particle size of between 0.25 mm to 1.0 mm.

8. The method of drying hydrolytic lignin of claim 2, wherein the hydrolytic lignin product has a relative moisture content of 45% to 55%.

9. The method of drying hydrolytic lignin of claim 2, wherein the hydrolytic lignin having a relative moisture content of 55% to 80% and the hydrolytic lignin having a relative moisture content of 0% to 45% are blended in a hopper.

10. The method of drying hydrolytic lignin of claim 9, wherein the hydrolytic lignin having a relative moisture content of 0% to 45% is added to the hopper before adding the hydrolytic lignin having a relative moisture content of 55% to 80%.

11. The method of drying hydrolytic lignin of claim 2, wherein the transfer of the dried hydrolytic lignin from the drying and grinding unit to the separation and storage area by a pneumatic transport system.

12. The method of drying hydrolytic lignin of claim 2, wherein the first heat-transfer medium has a temperature of 80° C. to 180° C. and the second heat-transfer medium has a temperature of 200° C. to 300° C.

13. The method of drying hydrolytic lignin of claim 2, wherein the dried hydrolytic lignin has a moisture content of 0% to 25%.

14. The method of transporting hydrolytic lignin of claim 5, wherein the mechanism is a conveyor belt.

15. An explosion and fire-safe method of drying hydrolytic lignin comprising a gas-air heat exchanger including:

blending a hydrolytic lignin having a relative high moisture content of 55% to 80% with a hydrolytic lignin having a relative low moisture content of 0% to 45% to produce a hydrolytic lignin product having a relative moisture content of 45% to 55%, wherein the ratio of the hydrolytic lignin having the high moisture content to the hydrolytic lignin having the low moisture content is from 1:6 to 10:1 and wherein the hydrolytic lignin with a moisture content of 0% to 45% is deposited on a conveyor belt prior to depositing a hydrolytic lignin with a moisture content of 55% to 80% onto the conveyor belt to produce the hydrolytic lignin product, transferring the hydrolytic lignin product to a tube dryer, pre-drying the hydrolytic lignin product using a stream of a first heat-transfer medium in the tube dryer to produce a pre-dried hydrolytic lignin having a relative moisture content of 30% to 40%, wherein the first heat-transfer medium has a temperature of 60° to 425° C., transferring the pre-dried hydrolytic lignin to a drying and grinding unit, further drying the pre-dried hydrolytic lignin in a stream of a second heat-transfer medium in the drying and grinding unit to produce a dried hydrolytic lignin having a relative moisture content of 0% to 25%, wherein the second heat-transfer medium has a temperature of 180° to 425° C., transferring the dried hydrolytic lignin to a separation and storage area, and separating the dried hydrolytic lignin by particle size using vibrating inclined screens.

\* \* \* \* \*